United States Patent [19]
Uematsu et al.

[11] 3,849,667
[45] Nov. 19, 1974

[54] INTRACAVITY SECOND HARMONIC GENERATOR

[75] Inventors: Yutaka Uematsu, Tokyo; Tsuguo Fukuda, Yokohama, both of Japan

[73] Assignee: Tokyo Shibaura Electric Co., Ltd., Saiwai-ku, Kawasaki-shi, Japan

[22] Filed: Aug. 13, 1973

[21] Appl. No.: 387,820

[30] Foreign Application Priority Data
Aug. 16, 1972 Japan .............................. 47-82027

[52] U.S. Cl. .............................. 307/88.3, 321/69 R
[51] Int. Cl. .......................................... H02m 5/06
[58] Field of Search .................. 307/88.3; 321/69 R

[56] References Cited
UNITED STATES PATENTS
3,721,831  3/1973  Bergman et al. .................... 307/88.3

*Primary Examiner*—Herman Karl Saalbach
*Assistant Examiner*—Darwin R. Hostetter
*Attorney, Agent, or Firm*—Oblon, Fisher, Spivak, McClelland & Maier

[57] ABSTRACT

An intracavity second harmonic generator which comprises an optical resonator composed of two reflectors having the prescribed curvatures; and a laser element and a second harmonic generating element, which are received in the optical resonator; wherein the laser element can emit rays having an oscillated wave length of 0.9 to 1.1 microns and the second harmonic generating element consists of crystalline potassium niobate.

6 Claims, 5 Drawing Figures

INTRACAVITY SECOND HARMONIC GENERATOR

This invention relates to an intracavity second harmonic generator having a second harmonic generating element received in an optical resonator.

Multiplication of rays emitted by a laser oscillator is effected by placing a second harmonic generating element in the optical resonator. In this case, a nonlinear optical crystal used as a second harmonic generating element is demanded to meet the undermentioned requirements:

1. The crystal should be able to carry out a very efficient conversion from the fundamental to the harmonic wave.
2. The crystal should be little subject to light loss, and particularly have good optical homogeneity, namely, phase matching between the fundamental and harmonic waves should be attained at a uniform temperature at various parts of the crystal.
3. The crystal should be free from any optical damage, namely, any change in the refraction index when laser rays pass through the crystal body.
4. The crystal should admit of easy temperature control for phase matching between the fundamental and harmonic waves.

The prior art intracavity second harmonic generator, using a laser element of $Y_3Al_5O_{12}$/Nd (abbreviated as YAG/Nd) or $YAlO_3$/Nd (abbreviated as YAO/Nd) which gives forth laser rays having an oscillated wave length of 0.9 to 1.1 microns, had a second harmonic generating element of $LiNbO_3$ or $Ba_2NaNb_5O_{15}$. However, $LiNbO_3$ is readily subject to an optical damage, failing to meet the above-mentioned requirement under Item 3. Though it is advised to use a crystal in which phase matching between the fundamental and harmonic waves can be effected at a higher temperature than 170°C, yet such crystal has low optical homogeneity, failing to satisfy the aforesaid requirement under Item 2. In contrast, $Ba_2NaNb_5O_{15}$ carries out the most efficient conversion from the fundamental to the harmonic wave among highly dielectric substances and, what is better, is little subject to an optical damage, and consequently displays considerably good optical properties. However, it is difficult to grow this $Ba_2NaNb_5O_{15}$ so as to make it little subject to optical loss and capable of displaying good optical homogeneity. Even if said dielectric substance could be so prepared as to meet the above-mentioned requirements, its low yield would unavoidably lead to its high cost.

After all, there has not been developed to data any good second harmonic generating element adapted for use with an intracavity second harmonic generator using a laser element emitting rays having an oscillated wave length of 0.9 to 1.1 microns.

Accordingly, the present inventors have paid attention to potassium niobate ($KNbO_3$) which can be so prepared as to have high crystallinity and good optical properties, though it indicates a somewhat lower efficiency (practically about 80 percent) of effecting conversion from the fundamental to the harmonic wave, as compared with $Ba_2NaNb_5O_{15}$. However, the prior art process has failed to produce said $KNbO_3$ with good optical properties and high crystallinity. The present inventors have studied the method of producing $KNbO_3$ and discovered a process of easily and moreover reliably attaining the poling of a single crystal, such as $KNbO_3$. As the result, the present inventors have succeeded in providing $KNbO_3$ having the above-mentioned properties and applying it to an intracavity second harmonic generator as a second harmonic generating element.

It is accordingly the object of this invention to provide an intracavity second harmonic generator containing a laser element emitting rays having an oscillated wavelength of 0.9 to 1.1 microns, with which $KNbO_3$ is used as a second harmonic generating element.

This invention can be more fully understood from the following detailed description when taken in connection with reference to the accompanying drawings, in which.

Figure 3:
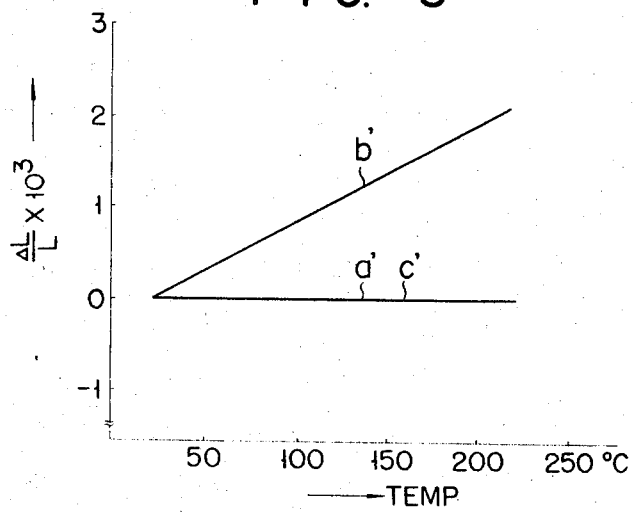
Figure 4:
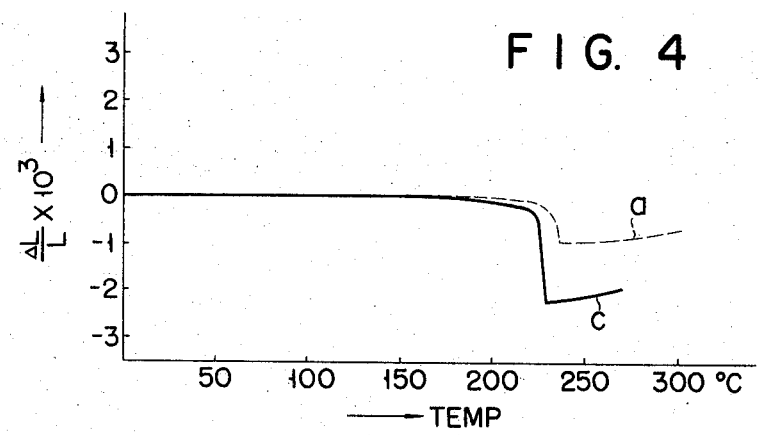
Figure 5:
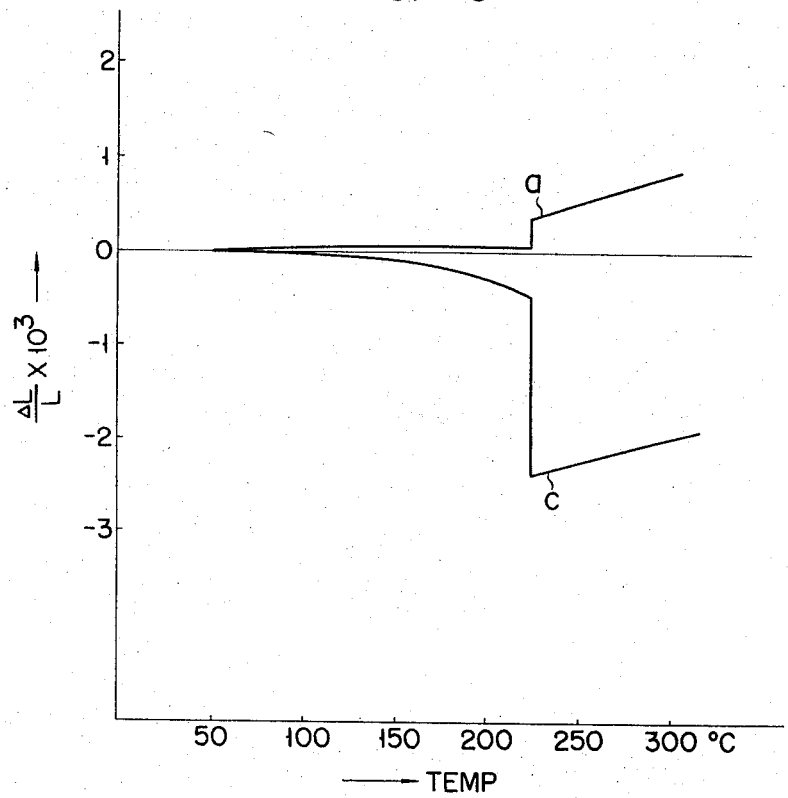

FIG. 3 presents variations with temperature in the lengths of the single crystal along the axes of $a'$, $b'$ and $c'$;

FIG. 4 indicates changes with temperature in the lengths of the single crystal in the axes of $a$ and $c$; and FIG. 5 shows variations with temperature in the lengths of the single crystal subjected to poling in the axes of $a$ and $c$.

Figure 1:
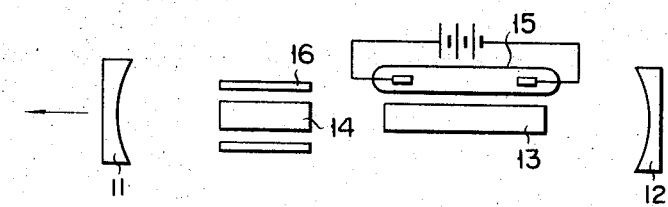
FIG. 1 is a schematic illustration of a second harmonic generator according to this invention.

Referring to FIG. 1, an optical resonator consists of a reflector 11 having a curvature radius of 30 cm and another reflector 12 having a curvature radius of 50 cm which are so arranged as to cause the reflecting surfaces to face each other. In this optical resonator are received a laser element 13 and a second harmonic generating element 14. The laser element 13 consists of a laser rod of YAG/Nd. In the optical resonator is further provided a tungsten-iodine lamp 15 acting as a pumping source. The laser element 13 and the lamp 15 are so placed in an elliptic cylinder (not shown) that light beams emitted from the lamp 15 and reflected on the reflection surface of the cylinders focus upon the laser element 13. The second harmonic generating element 14 is single crystal $KNbO_3$ measuring 5 mm × 7 mm × 5 mm which is prepared by the Kyropoulos method, followed by the later described poling process. The $b$ plane of the single crystal $KNbO_3$ constituting the second harmonic generating element 14 is optically polished and coated with an anti-reflection coat, and so located in the optical resonator as to cause the axis of the $b$ plane to be aligned with the optical axis of the laser element 13. The $KNbO_3$ is heated by a heater 16 to a temperature of 181°C at which phase matching between the fundamental and harmonic waves can be effected. The reflector 11 has a permeability of 0.04 percent to rays oscillated with a wave length of 1.06 microns from the laser rod of YAG/Nd constituting the laser element 13 and also a permeability of 90 percent to rays having a wave length of 0.53 microns which are obtained by multiplying the rays oscillated from said laser rod of YAG/Nd. On the other hand, the reflector 12 has a permeability of 0.2 percent to rays having an oscillated wave length of 1.06 microns and also a permeability of 90 percent to the aforesaid rays having a wave length of 0.53 microns.

In the intracavity second harmonic generator arranged as described above, rays oscillated with a wave length of 1.06 microns from the laser rod constituting the laser element 13 are repeatedly reflected between the reflectors 11 and 12 which have a high reflectance to said rays, thereby attaining laser oscillation. Part of the laser oscillation rays having a wave length of 1.06 microns is converted by the single crystal $KNbO_3$ into multiplied rays having a wave length of 0.53 microns. The multiplied rays having a wave length of 0.53 microns pass through the reflectors 11 and 12 which have a high permeability to said wave length and are emitted to the outside.

As measured by the present inventors, multiplied rays reflected from one of the reflectors 11 and 12 have an output of 150 mW, namely, both reflectors give forth multiplied rays having a total output of 300 mW.

When the reflectors were replaced by those having permeability of 2 percent to rays having an oscillated wave length of 1.06 microns, the output was also measured to be 300 mW. This fact proves that the intracavity second harmonic generator of this invention substantially fully converted rays having an oscillated wave of 1.06 microns into those of a 0.53 microns wave. Determination was also made of changes in a threshold output from the laser rod of YAG/Nd constituting the laser element 13, when the single crystal $KNbO_3$ was placed in the optical resonator. Also, loss of an output resulting from the use of the $KNbO_3$ was estimated from said changes to be only 0.15 percent. Further, the $KNbO_3$ did not indicate any optical damage even when used for long hours. Measurement was made of the temperatures at which phase matching between the fundamental and harmonic waves were carried out at various parts of the single crystal $KNbO_3$, showing that the temperatures varied within a very small range of 181°C ± 2°C. As the result, it has been found that the temperature of the heater 16 can be easily controlled within small bounds, thus facilitating phase matching between the fundamental and harmonic waves and elevating practical conversion from the former to the latter.

By way of comparison, determination was made of variations in the phase matching temperature occurring in other single crystal second harmonic generating elements, showing that said variations ranged from −4°C to 180°C in $LiNbO_3$ and from 50°C to 120°C in $Ba_2NaNb_5O_{15}$, namely, that the phase matching temperature more broadly varied in these single crystals than in $KNbO_3$.

Comparison was made of the properties of the above-mentioned second harmonic generating elements, the results being set forth in Table 1 below.

When the previously mentioned single crystal $KNbO_3$ used as a second harmonic generating element whose planes of $a$, $b$ and $c$ measured 5 mm, 7 mm and 5 mm respectively was replaced by another $KNbO_3$ measuring 5 mm × 3 mm × 5 mm, there was obtained an output of 120 mW consisting of multiplied rays having a wave length of 0.53 microns, showing that 80 percent of rays having an oscillated wave length of 1.06 microns were converted into those having a wave length of 0.53 microns. In this case, the loss of an output resulting from the use of said another $KNbO_3$ was as small as 0.1 percent.

The foregoing description refers to the case where there was used a laser rod of YAG/Nd as a laser element. However, it is possible to substitute it for a laser rod of YAO/Nd which emits rays having a wave length of 1.08 microns, though, in this case, phase matching between the fundamental and harmonic waves has to be carried out at a slightly higher temperature than in the case of the first mentioned laser rod.

As mentioned above, application of single crystal $KNbO_3$ as a second harmonic generating element provides an intracavity second harmonic generator displaying prominent properties.

There will now be described the method of growing said single crystal $KNbO_3$, particularly the poling process. With increasing temperature, a highly dielectric crystal such as $KNbO_3$ has a nature to expand along other axes than the polarization axis, and contract itself near the Curie point on the polarization axis or near the transition point at which the voluntary polarization axis varies. Poling of the crystal is carried out by finding the crystallization direction in which the crystal contracts itself most prominently with increasing temperature (the polarization axis is most broadly distributed in the crystallization direction) and applying an electric field in said crystallization direction.

Figure 2:
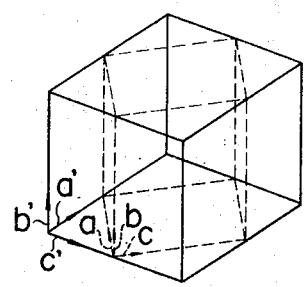
FIG. 2 is an oblique view of single crystal $KNbO_3$.

To describe the poling process in further detail, crystalline potassium niobate ($KNbO_3$) is first prepared by the Kyropoulos method. The crystal obtained is cut along the pseudocubic axes of $a'$, $b'$ and $c'$ to provide a crystal body shown in FIG. 2. While the crystal thus cut is progressively heated from room temperature to 200°C, measurement is made of variations $\Delta L$ in the lengths of the crystal along the axes of $a'$, $b'$ and $c'$. FIG. 3 shows said variations $\Delta L$ in the lengths of the crystal along the axes of $a'$, $b'$ and $c'$ as compared with Table 1

| | Efficiency of conversion from the fundamental to the harmonic wave with the value obtained with $LiNbO_3$ taken to be 1 | Optical homogeneity | Optical damage | Variations in the temperature used to effect phase matching with the fundamental wave length of 1.06 microns |
|---|---|---|---|---|
| $LiNbO_3$ | 1 | Fairly good | Observed | −4°C to 180°C |
| $Ba_2NaNb_5O_{15}$ | 5 | Not good | Not observed | 50°C to 120°C |
| $KNbO_3$ | 4 | Good | Not observed | 181°C ± 2°C |

As clearly seen from Table 1 above, $KNbO_3$ is slightly inferior to $Ba_2NaNb_5O_{15}$ in respect of the efficiency of conversion from the fundamental to the harmonic wave, but is equal to, or even better than, $Ba_2NaNb_5O_{15}$ in other respects.

the lengths in said axes at room temperature. As apparent from FIG. 3, the length of the crystal along the axis of $b'$ extends with increasing temperature, whereas the lengths along the axes of $a'$ and $c'$ do not present any change. This shows that the polarization axis of the crystal is most broadly distributed in a plane including the axes of $a'$ and $c'$.

The crystal is cut along the axes of $a$, $b$ and $c$ of an orthorhombic system with the axis of $b'$ taken as the base. Measurement is made of variations with increasing temperature in the lengths of the crystal thus cut along the axes of $a$, $b$ and $c$, the results being presented in FIG. 4. As seen from this figure, the lengths of the crystal along the axes $a$ and $c$ are reduced near the transition point (215°C) at which the voluntary polarization axis presents changes, and the length of the crystal is more shortened along the axis of $c$ than along the axis of $a$.

From the above results, it can be estimated that the polarization axis of the crystalline $KNbO_3$ is most broadly distributed along the axis of $c$. Accordingly, the crystalline $KNbO_3$ is heated to a temperature of 180°C to 200°C in silicone oil and an electric field of about 1 Kv/cm is applied along the axis of $c$, for a period of 1 to 3 hours, thereby providing fully poled $KNbO_3$. Determination was made of variations with increasing temperature in the lengths of the fully poled $KNbO_3$, the results being presented in FIG. 5, which shows that the length of the crystal along the axis of $c$ is most prominently shortened near the transition point (215°C) at which the voluntary polarization axis of the crystal indicates changes.

Development of the above-mentioned poling process has facilitated the production of crystalline $KNbO_3$ which is adapted for use as a second harmonic generating element. Accordingly, application of this $KNbO_3$ can provide an intracavity second harmonic generator displaying a high performance.

What is claimed is:

1. An intracavity second harmonic generator which comprises an optical resonator; crystalline potassium niobate received in the optical resonator so as to act as a second harmonic generating element, a laser element received in the optical resonator and emitting rays having an oscillated wave length of 0.9 to 1.1 microns; and a heater for heating the second harmonic generating element to the temperature at which phase matching between the fundamental and harmonic waves can be effected.

2. An intracavity second harmonic generator according to claim 1 wherein the laser element is a laser rod of YAG/Nd emitting rays having an oscillated wave length of 1.06 microns.

3. An intracavity second harmonic generator according to claim 2 wherein the optical resonator consists of a first reflector having a permeability of 0.04 percent to rays having an oscillated wave length of 1.06 microns and a permeability of 90 percent to rays having a wave length of 0.53 microns and a second reflector having a permeability of 0.2 percent to rays having an oscillated wave length of 1.06 microns and a permeability of 90 percent to rays having a wave length of 0.53 microns.

4. An intracavity second harmonic generator according to claim 1 wherein the second harmonic generating element is single crystal $KNbO_3$ whose planes along the axes of $a$, $b$ and $c$ measure 5 mm, 7 mm and 5 mm respectively.

5. An intracavity second harmonic generator according to claim 1 wherein the second harmonic generating element is single crystal $KNbO_3$ whose planes along the axes of $a$, $b$ and $c$ measure 5 mm, 3 mm and 5 mm respectively.

6. An intracavity second harmonic generator according to claim 1 wherein the second harmonic generating element is single crystal $KNbO_3$ subjected to poling by applying an electric field along the crystallization axis in which the crystal contracts itself most prominently when increasing temperature is applied thereto.

* * * * *